(12) United States Patent
Baldwin et al.

(10) Patent No.: US 8,744,237 B2
(45) Date of Patent: Jun. 3, 2014

(54) PROVIDING VIDEO PRESENTATION COMMENTARY

(75) Inventors: James A. Baldwin, Palo Alto, CA (US); Joseph H. Matthews, III, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 13/164,434

(22) Filed: Jun. 20, 2011

(65) Prior Publication Data

US 2012/0321271 A1    Dec. 20, 2012

(51) Int. Cl.
  *H04N 9/80* (2006.01)
  *H04N 5/92* (2006.01)
  *H04N 9/87* (2006.01)

(52) U.S. Cl.
  CPC ................................. *H04N 9/8715* (2013.01)
  USPC .......................................... 386/239; 386/245

(58) Field of Classification Search
  CPC .............................. H04N 5/765; H04N 9/8715
  See application file for complete search history.

(56) References Cited

U.S. PATENT DOCUMENTS

| | | | |
|---|---|---|---|
| 7,716,376 B1 | 5/2010 | Price et al. | |
| 7,788,692 B2 | 8/2010 | Rambo | |
| 7,913,157 B1 | 3/2011 | Stoakley et al. | |
| 2003/0182663 A1 | 9/2003 | Gudorf et al. | |
| 2005/0262542 A1 | 11/2005 | DeWeese et al. | |
| 2009/0212923 A1 | 8/2009 | Tokashiki et al. | |
| 2009/0328122 A1* | 12/2009 | Amento et al. ............. | 725/114 |
| 2010/0037277 A1 | 2/2010 | Flynn-Ripley et al. | |
| 2012/0150997 A1* | 6/2012 | McClements, IV .......... | 709/217 |

FOREIGN PATENT DOCUMENTS

| | | |
|---|---|---|
| JP | 2005275985 A | 10/2005 |
| JP | 2007151057 A | 6/2007 |
| JP | 2010147507 A | 7/2010 |

OTHER PUBLICATIONS

Weisz, et al. "How Text and Audio Chat Change the Online Video Experience", Retrieved at <<http://citeseerx.ist.psu.edu/viewdoc/download?doi=10.1.1.141.6137&rep=rep1&type=pdf>>, Proceeding of the 1st international conference on Designing interactive user experiences for TV and video, Oct. 22-24, 2008, pp. 10.

Diaz, Sam, "Google TV will revolutionize television once viewers understand it", Retrieved at <<http://www.zdnet.com/blog/btl/google-tv-will-revolutionize-television-once-viewers-understand-it/39996>>, Oct. 5, 2010, pp. 3.

(Continued)

*Primary Examiner* — William C Vaughn, Jr.
*Assistant Examiner* — Asher Khan
(74) *Attorney, Agent, or Firm* — Micah Goldsmith; Glen Johnson; Micky Minhas

(57) ABSTRACT

Embodiments are disclosed that relate to providing commentary for video content. For example, one disclosed embodiment provides a method comprising receiving and storing an input of commentary data from each of a plurality of commentary input devices, and also, for each input of commentary data, receiving and storing identification metadata identifying a commentator, for each input of commentary data, synchronization metadata that synchronizes the commentary data with the associated media content item is received and stored. The method further comprises receiving a request from a requesting media presentation device for commentary relevant to a specified media content item and a specified user, identifying relevant commentary data based upon social network information for the specified user, and sending the relevant commentary data to the requesting client device.

15 Claims, 5 Drawing Sheets

(56) References Cited

OTHER PUBLICATIONS

"How Twitter Will Rescue Live Television", Retrieved at <<http://www.massrelevance.com/how-twitter-will-rescue-live-television/>>, Jan. 2, 2011, pp. 3.

"Social Media Meets Online Television: Social TV Brings Television 2.0 to Your TV Set", Retrieved at <<http://www.masternewmedia.org/social-media-meets-online-television-social-tv-brings-television-20-to-your-tv-set/>>, Jan. 27, 2010, pp. 17.

"News Commentary: TV 3.0?", Retrieved at <<http://www.it-thoughtoftheday.com/2010/05/03/news-commentary-tv-3-0>>, Retrieved Date: Mar. 9, 2011, pp. 2.

Braue, David, "Twitter-integrated TV: Stepping into the time warp?", Retrieved at <<http://www.cnet.com.au/twitter-integrated-tv-stepping-into-the-time-warp-339298475.htm>>, Sep. 16, 2009, pp. 3.

"International Search Report", Mailed Date: Dec. 28, 2012, Application No. PCT/US2012/043026, Filed Date: Jun. 18, 2012 pp. 10.

\* cited by examiner

Fig. 1
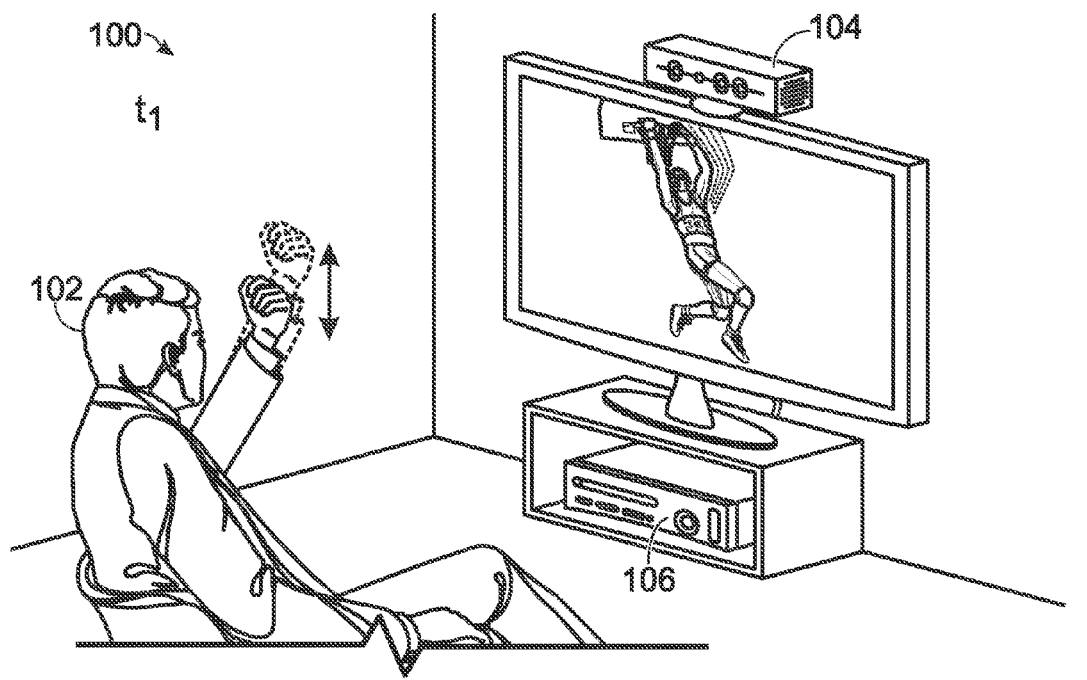
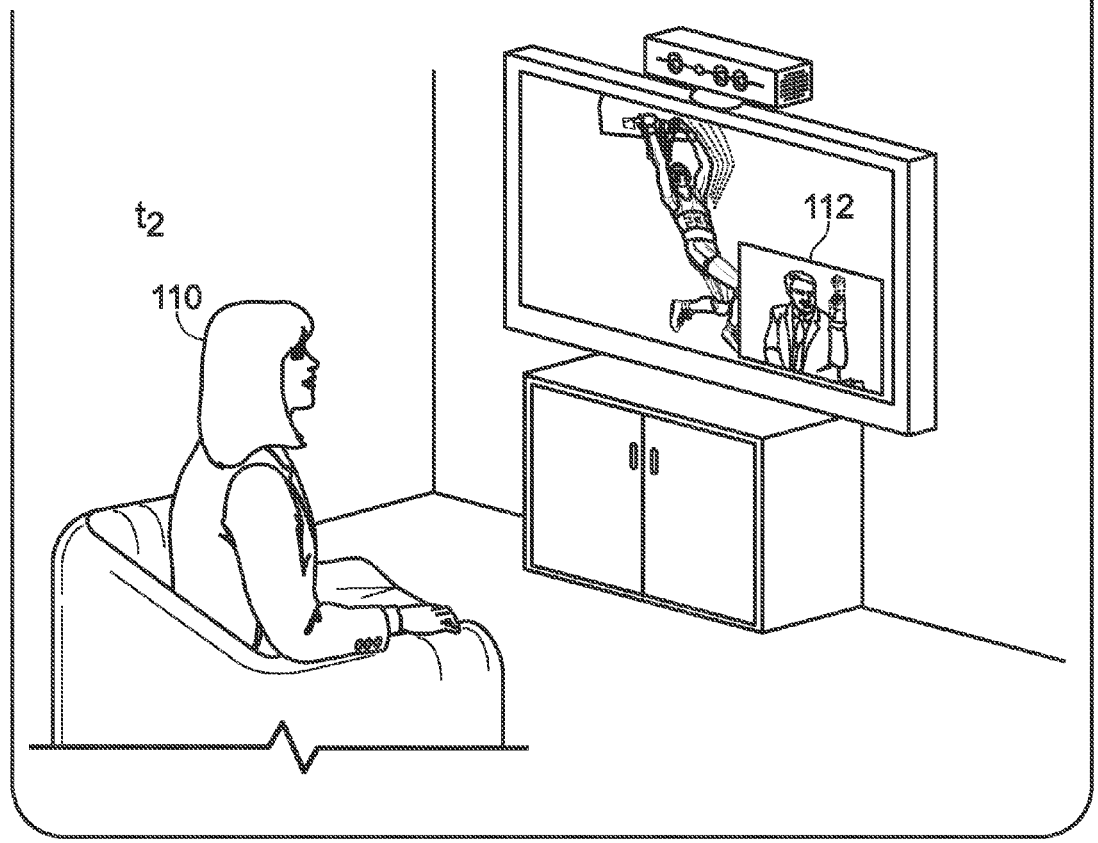

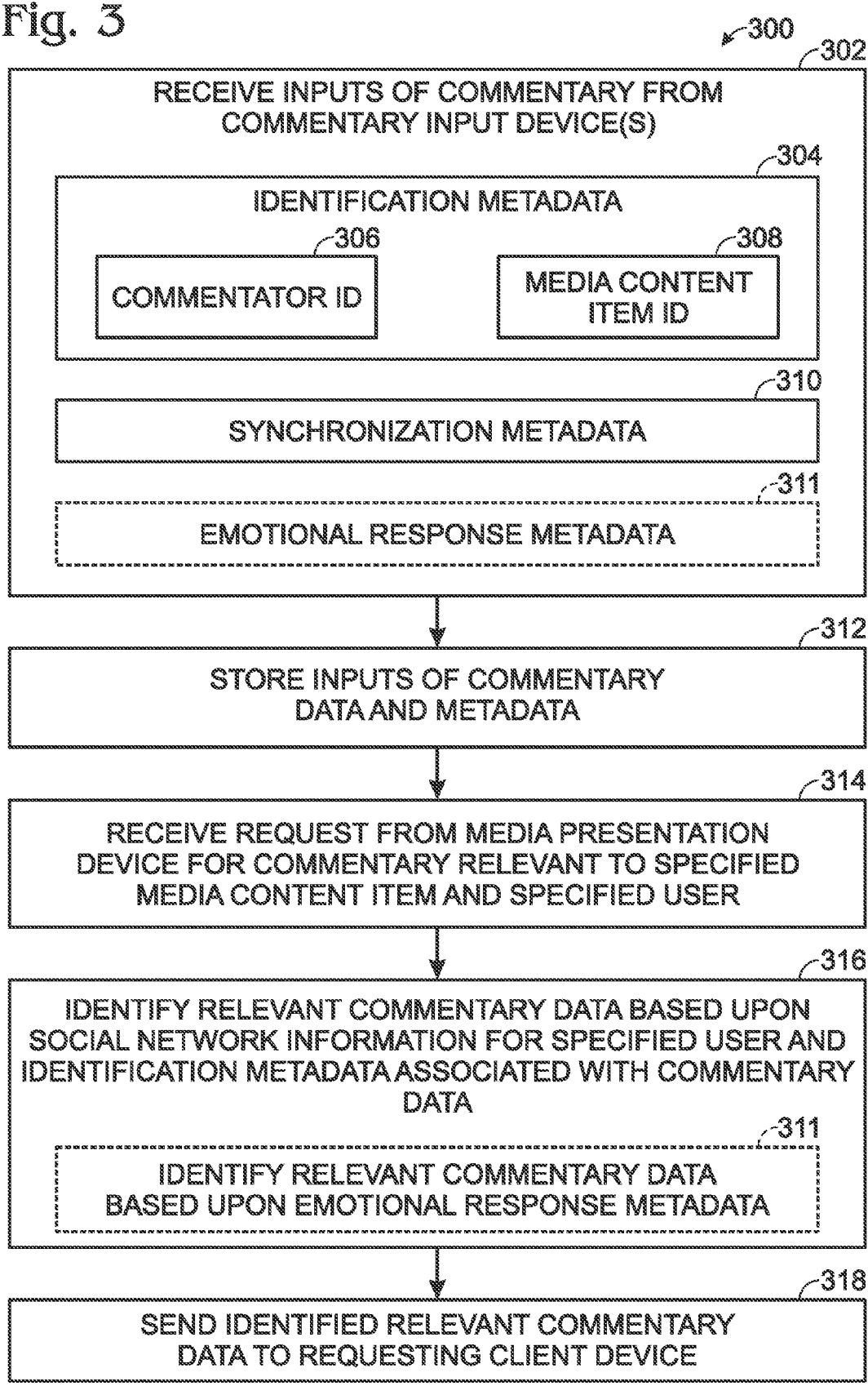

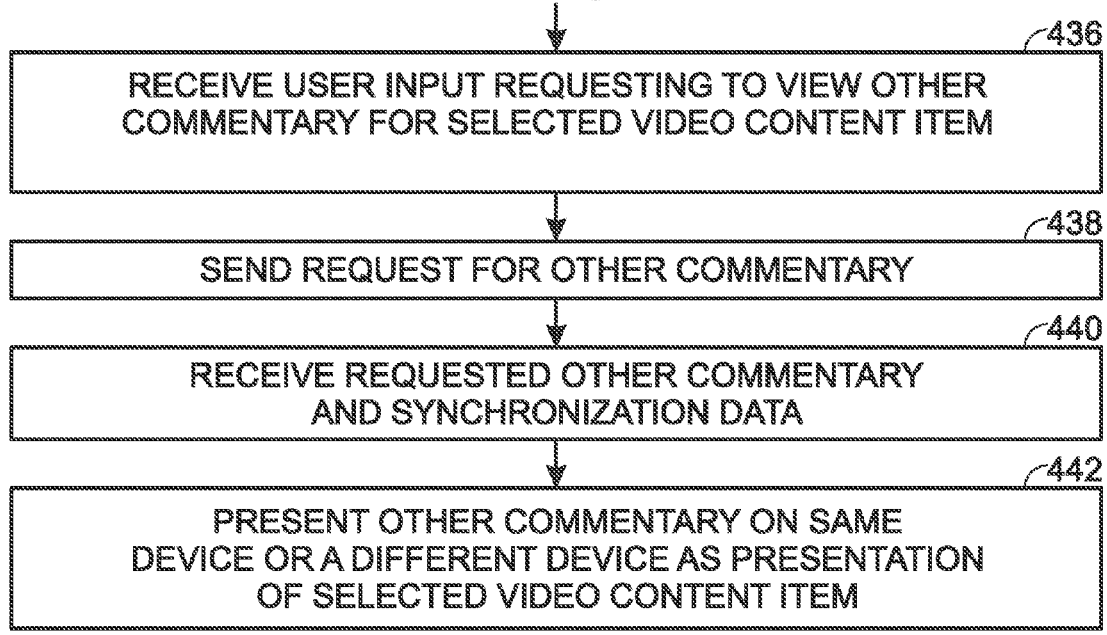
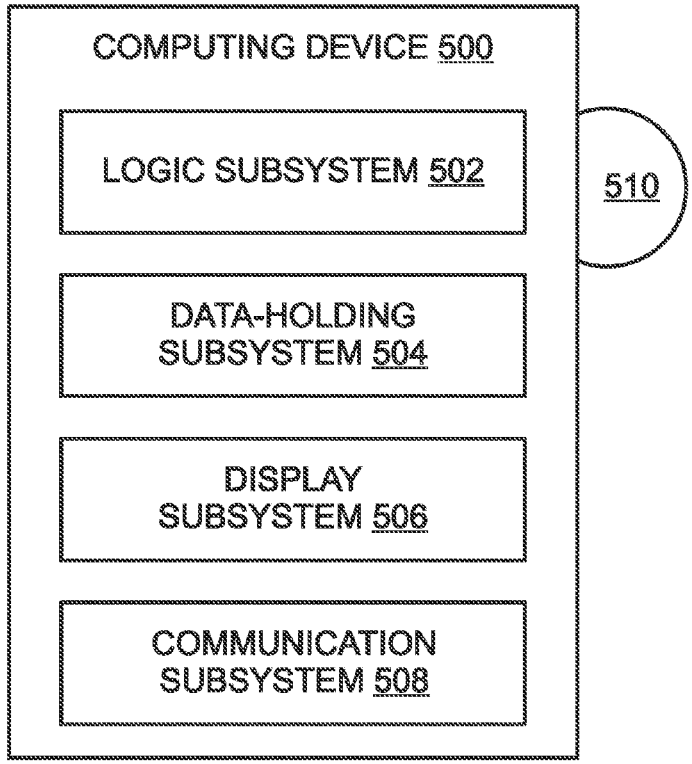

PROVIDING VIDEO PRESENTATION COMMENTARY

BACKGROUND

Some video presentations may he accompanied by commentary related to the content being presented. Such commentary may take many different forms. For example, commentators are often used in sports broadcasts to discuss game events as they occur. Commentators also may provide commentary on other real-time events, such as political debates, as well as on pre-recorded content.

Commentary is often recorded as an integral part of the content, such that the same commentary is replayed with each rebroadcast of the content. Further, the generation of such commentary is often performed under the control of the content producer. Thus, such commentary may be relatively limited in perspective.

SUMMARY

Various embodiments are disclosed that relate to providing commentary for video content items. For example, one disclosed embodiment provides a method comprising receiving and storing an input of commentary data from each of a plurality of commentary input devices, and also, for each input of commentary data, receiving and storing identification metadata identifying a commentator and an associated media content item. Further, for each input of commentary data, synchronization metadata that synchronizes the commentary data with the associated media content item is received and stored. The method further comprises receiving a request from a requesting media presentation device for commentary relevant to a specified media content item and a specified user, identifying relevant commentary data based upon social network information for the specified user, and sending the relevant commentary data to the requesting client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 illustrates the generation and later playback of commentary according to an embodiment of the present disclosure.

FIG. 3 shows a flow diagram depicting an embodiment of a method of providing commentary relevant to a selected video content item.

FIGS. 4A-4B show a flow diagram depicting an embodiment of a method of generating commentary data and requesting/playing commentary data.

FIG. 5 shows an embodiment of an example computing device.

DETAILED DESCRIPTION

Figure 2:
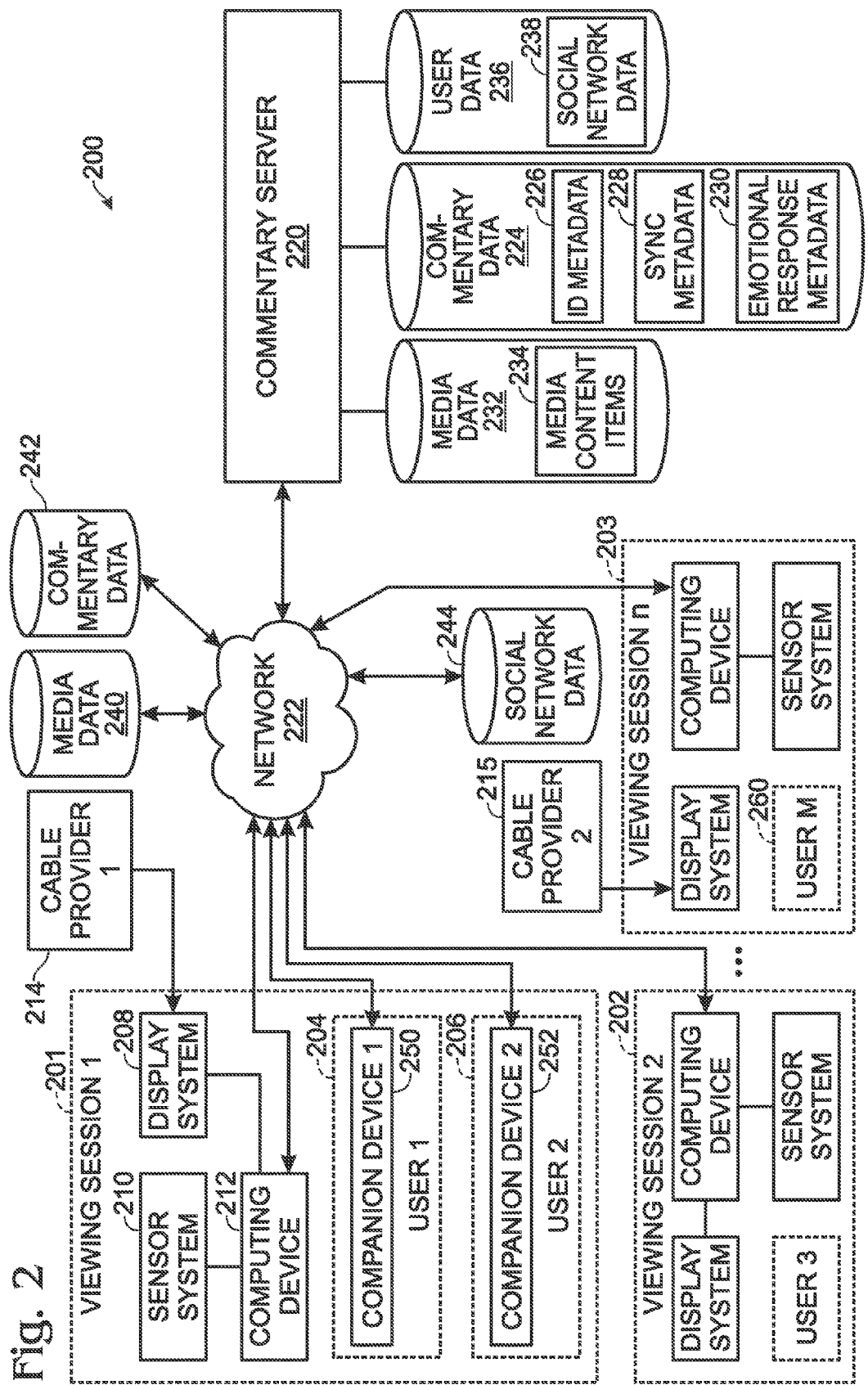
FIG. 2 shows a schematic diagram of an embodiment of a use environment for recording and presenting video content commentary.

As mentioned above, video content commentary is often provided by the producer of the underlying content. For example, networks that broadcast sports presentations often utilize commentators that attend the sports presentation to provide play-by-play critique, discussion of interesting player and team statistics, and the like. However, because such commentary is provided and controlled by the show producer, viewers may have a single or small number of choices of different commentators.

More recently, the provision of video content by computer network has opened more opportunities for different commentators to provide commentary for video content items. For example, users may record video content, add commentary to the recording, and then post the commentary-containing recording to a video distribution website. In such cases, while the commentary in such a scenario may not be controlled by the original video producer, the commentary is still stored with the video content, and as such cannot be consumed separately. Further, restrictions on the reproduction of the video content may limit such commentary opportunities. Additionally, the effort involved in recording commentary over the video content and then distributing the resulting modified video content may limit the number of users that provide such commentary.

Therefore, embodiments are disclosed herein that relate to capturing, storing and providing commentary on video content items in a convenient manner. The disclosed embodiments utilize a commentary capture device, such as sensor system comprising one or more of an image sensor, an acoustic sensor, and a depth sensor, to record actions performed by a viewer while watching a video content item. A user may opt to send such recorded commentary to a commentary service on a remote server, such that the commentary may be available for others to access when viewing the same video content at a later time. Various metadata may be sent to the commentary service along with the recorded commentary to aid in the later selection and playback of the commentary. Examples of such metadata may include, but are not limited to, identification metadata that identifies the commentator and the video content item that is the subject of the commentary, and also synchronization metadata that allows the commentary to be synchronized with the video content during later playback. In some cases, such synchronization metadata may allow the commentary to be presented at a comet location in the video content even if an edited version of the video content item is played.

The disclosed embodiments may allow anyone who wishes to be a commentator to publish commentary for a video content item for later consumption by others watching the video content item. This may allow viewers to see reactions and comments of friends that previously watched the same content item, and therefore may allow the later viewer to share in the experience with the earlier-viewing friends. Further, this may allow individuals to seek social status and, potentially, advertising revenue by publishing popular commentary.

FIG. 1 shows an example use scenario in which commentary may be recorded for later playback with a video content item. First referring to viewing environment 100, a viewer 102 is watching a basketball game at a time $t_1$, and pumping his fist into the air in response to a player dunking the ball. Viewer 102 has previously elected to have sensor system 104 record his actions while watching the game. Thus, sensor system 104 records video and/or audio of the user's actions, and provides the video and/or audio as inputs to a computing device 106. Computing device 106 may then tag the video and/or audio inputs, hereinafter referred to as commentary, with identification and synchronization metadata. Upon completing a viewing session (e.g. upon turning off the television, completion of the video content item, or other such concluding event), viewer 102 may be presented with an option of uploading the commentary to a remote server for access by others. If the user elects not to share the commentary, then the commentary is not saved. On the other hand, if the user elects to share the commentary, the commentary and metadata is uploaded to a remote server via a network.

Next, viewer 110 may elect to watch the same basketball at a later time $t_2$. For example, viewer 110 may have recorded the basketball broadcast via a digital video recorder, or may have accessed a copy of the broadcast via a computer network. Further, viewer 110 has elected to play commentary created by viewer 102 while watching the basketball game. As such, video commentary and/or audio commentary created by viewer 102 while watching the basketball game is presented to viewer 110 along with the basketball game and synchronized with the basketball game. For example, in the depicted embodiment, viewer 110 sees viewer 102's commentary displayed in a window 112, and thus can see viewer 102 pumping his fist into the air at the same location in the basketball game that originally prompted this action. In this manner, viewers watching separate broadcasts of a video content item may still share in the experience, even when watching the video content item at different times. It will he understood that commentary may he presented in any suitable manner, including but not limited to on a primary display device and/or on a companion device, such as a smart phone, notepad computer, laptop computer, etc., and may be presented in video and/or audio format.

The disclosed embodiments also may provide a convenient mechanism for business and other entities to reach out to interested patrons. For example, an entity may provide commentary that includes a link to a shopping site or that triggers a shopping software widget to allow a user to buy a product that is featured in a media content item. Such commentary may he presented on a same display on which the media content item is presented, or may be presented on a companion device (e.g. a viewer's smart phone).

FIG. 2 shows an example embodiment of a video content and commentary use environment 200. Use environment 200 illustrates an arbitrary number M of users participating in an arbitrary number N of different viewing sessions, which may or may not be temporally overlapping. Each viewing session is depicted as receiving video content from a different source. For example, viewing session 1 201 receives content from cable provider 1 214 via a cable TV connection, viewing session 2 202 receives content via a computer network, and viewing session 3 203 receives content from cable provider 2 215. It will be understood that content may be received from any suitable source, including but not limited to via a satellite receiver, via an antenna, via a local playback device such as a DVD player, or in any other suitable manner.

Referring to viewing session 1 201, two viewers, shown as user 1 204 and user 2 206, are watching a television system 208 together. As users 1 and 2 watch television, they may elect to record their actions in audio and/or video format via a commentary input device, such as a viewing environment sensor system 210, as described above. As such, a computing device 212 may be configured to receive output from sensor system 210 and thus record the commentary provided by the users. Computing device 212 may further be configured to tag the commentary with metadata regarding the identification of the video content item currently being played, and also the identities of the viewers providing commentary. It will be understood that, while FIG. 2 depicts the display device, sensor system and computing device as separate components, two or more of these devices may he integrated in other embodiments.

The commentary may take any suitable form, including but not limited to speech, actions, gestures, etc., and may be made consciously or unconsciously. Further, commentary may be provided by other input sensors than audio and image sensors. For example, a user may utilize a sensor in the form of a keyboard (hardware or software) or other text input device to input text and/or markup commentary. Such markup may include hyperlinks, software triggers, and other interactive elements.

in some embodiments, computing device 212 may be configured to generate emotional response metadata from the audio and/or image data received from sensor system 210, such that emotional states may be attributed to the viewers. Such data may then be used to identify particularly interesting commentary for presentation, such that interesting portions of the commentary as selected based upon the emotional response metadata may be provided to a requesting viewer.

Computing device 212 may further be configured to generate synchronization metadata for the commentary. Synchronization metadata comprises information that allows the commentary to be appropriately synchronized with the video content item, so that, during playback, commentary is presented concurrently with the occurrence in the video item that prompted the commentary. The synchronization metadata may comprise any suitable metadata. For example, in some instances, the same device (e.g. computing device 212), may control the presentation of video content and the recording and playback of commentary. Similarly, a single entity may provide software and/or hardware for performing these functions, and thus may control the flow of data to and from these separate components. In such instances, a proprietary time stamp may be applied to the video content item and commentary. In some situations, such a time code may he specific to the particular version of the video content item being displayed (e.g. whether the video content item is edited or unedited for mature content). This may permit the commentary to be correctly synchronized to the video content when that version of the video content is played back. A time stamp also may be used in instances where the video content item was played from a local media such as a DVD, in which case information regarding a version of the video content stored on the DVD may be provided as additional identification metadata.

In other embodiments, the computing device 212 may generate a digital fingerprint of one or more frames of the video content item when particularly interesting commentary is detected (e.g. by emotional response metadata), and then tag that commentary with the fingerprint as synchronization metadata. In this manner, the commentary may be synchronized with any version of the video content item that contains the fingerprinted frames, even if the content has been edited, for example, by deleting frames, by shortening the opening and closing credits, etc.

In some instances, television system 208 may receive content from a source independent of computing device 212. For example, television system 208 may receive television content from a cable provider, such as cable provider 1 214, that is not affiliated with services running on computing device 212. In this instance, computing device 212 may not be able to directly determine an identity of the video content item currently being watched. As such, computing device 212 may be configured to record a sample of the audio portion of a video content item via an audio sensor of sensor system 210, and then contact a remote service to determine an identity of the audio/video broadcast by sending the recorded audio sample to the service. Then, upon obtaining an identity of the video content item, computing device 212 may send the commentary to a commentary service operated by cable provider 1 214, along with the identity of the video content item and a time at which the commentary was captured. The commentary service may then generate synchronization metadata for the commentary item using this information.

After recording the commentary and generating metadata for the commentary, computing device 212 is configured, upon confirmation by the viewer captured in the recorded commentary, to publish the commentary by sending the commentary and associated metadata to a commentary server 220 via a network 222, which may be operated by a same entity that provided the content associated with the commentary, or a different entity. Commentary server 220 may store such commentary and metadata respectively in a commentary data store 224. As shown in FIG. 2, commentary data store may be configured to store any suitable metadata, including but not limited to identification metadata 226, synchronization metadata 228, and emotional response metadata 230.

Commentary server 220 also may be in communication with other data stores. For example, in embodiments where a video content provider operates commentary server 220 to store commentary for video content owned or otherwise provided by that video content provider, commentary server 220 may communicate with a media data store 232 that stores media content items 234 for provision to requesting viewers.

Further, in some embodiments, commentary server 220 communicates with a user data store 236 that stores data related to registered users of commentary server 220, including but not limited to user account data. Such data may include, for example, user identification information, demographic information, and/or user device information that identifies one or more computing devices operated by the user. This may allow commentary to be provided to a companion device, such as a smart phone or notepad computer, during presentation of a media content item on another primary display device.

The user information also may include social network information related to social networks of a user, as indicated at 238. Social network information may be used in identifying commentary for presentation to that user. The term "social network information" as used herein may signify information regarding any other user with a social connection to the specified user. For example, the social network information may specify a list of other users that are formally connected via an online social network. Likewise, the social network information may comprise genealogic data and/or descriptive information, such as alumni information, that may be used to associate the specified user with other users likely to have more highly correlated interests and/or behaviors than other users not meeting the same descriptive information. Further, the social network information may comprise information regarding celebrities, artists, and other individuals or entities in which the specified user follows or likes on a social networking site.

It will be understood that, in other embodiments, commentary data, media data, and social network data also may be stored in locations remote to commentary server 220. Such remote storage is indicated by media data 240, commentary data 242, and social network data 244.

Continuing with FIG. 2, user 3 in viewing session 2 and user M in viewing session N also may elect to publish recorded commentary to commentary server 220. In this manner, commentary server 220 may collect and store commentary for a potentially wide variety of video content items from a diverse set of commentators.

Upon selection of a video content item and/or during viewing of a video content item in a viewing session, if commentary is available for that video content item, a viewer may elect to consume the commentary along with the video content item. Such commentary may be discovered in any suitable manner. For example, in some embodiments, a user may be alerted, upon selection of a video content item, to the existence of commentary provided by previously-approved commentators, such as social network members. Likewise, a user may also have the ability to search for commentary using a search engine. It will he understood that these methods of discovering commentary are presented for the purpose of example, and are not intended to be limiting in any manner.

Upon electing to view commentary, the relevant commentary is sent from commentary server 220 or other storage location to the requesting viewer. The commentary may be sent to a media computing device, such as computing device 212, for display on a primary display in the viewing environment (e.g. a television system or monitor), or may he sent to a companion device (e.g. a laptop computer, smart phone, notepad computer, portable media player, etc,), such as companion device 250 of user 1 and companion device 252 of user 2.

In some instances, commentary stored by one content provider may be requested by a viewer that receives content from another provider. As a more specific example, user M 260 may wish to view commentary provided by user 1. However, user M receives television content from cable provider 2 215, while user 1's commentary may be stored and provided by cable provider 1 214. Where the synchronization metadata of such commentary comprises a time stamp that is proprietary to cable provider 1 214 it may be difficult to synchronize the commentary with the content provided by cable provider 2 215 due to potential differences in the version of the media content presented. To overcome such difficulties, cable providers 1 and 2 may use a common time stamp, or may provide a mechanism for translating the synchronization metadata between the two cable providers. Likewise, the use of fingerprinting to synchronize commentary also may avoid such synchronization problems.

FIG. 3 shows a flow diagram depicting an embodiment of a method 300 of receiving and providing commentary data from the standpoint of a commentary server. Method 300 comprises, at 302, receiving inputs of commentary captured by one or more commentary input devices. Such commentary input devices may comprise, for example, audio and/or image sensors present in a video viewing environment, as well as text entry devices (e.g. hardware keyboard, software keyboard on notepad computer or smart phone, etc,) and any other input device (e.g. motion sensors on a portable device).

As mentioned above, metadata may be received with the commentary input. Such metadata may include identification metadata 304, such as a commentator identification 306 (whether an individual or other entity) and a media content identification 308 that identifies with which the commentary is associated. Further, such metadata also may comprise synchronization metadata 310 that facilitates synchronizing the commentary with the associated media content item. The synchronization metadata may comprise any suitable data useable to synchronize the commentary with the associated media content item, including but not limited to a time stamp and/or digital fingerprint information. Further, in some embodiments, the synchronization metadata may comprise an identity of the video content item for use by a content provider in generating a time stamp.

The metadata also may include emotional response metadata 311 that relates to the emotional response of a commentator as a function of location within the associated media content item. Such emotional response metadata may allow particularly interesting portions of commentary to he identified within a stream of audio commentary data based upon characteristics of the emotional response metadata.

Next, method 300 comprises, at 312, storing the inputs of the commentary data and metadata. Then, method 300 comprises, at 314, receiving a request from a media presentation device, such as a computing device, a television system, a mobile device, etc, for commentary relevant to a specified media content item and potentially a specified user. Upon receiving the request, method 300 comprises, at 316, identifying relevant commentary to send to the user. For example, in some embodiments, the relevant commentary may be identified based upon social network information for the specified user. In some situations, a user may specify a social network or a social network member to use in identifying commentary, while in other situations the existence of a social network may be inferred by descriptive information.

In some embodiments, identifying relevant commentary may comprise identifying particularly relevant portions of a stream of commentary data based upon emotional response metadata for that stream of commentary data. This may allow those portions of the stream of commentary data that appear to capture emotionally interesting commentary content to be presented. As a more specific example, the stream of commentary data comprises unedited video data or audio data of a commentator watching an entire football game while sitting at home on a sofa, the stream of commentary data may potentially comprise at least some material of little interest to another viewer. As such, emotional response metadata may be used to locate those portions of the stream of commentary data that are of particular interest.

After identifying the relevant commentary data, method 300 comprises, at 318, sending the identified relevant commentary data to the requesting computing device. The synchronization metadata for the commentary also may be sent. The commentary data that is sent may comprise a list of available commentary for the specified media content item, or may comprise commentary from a particular commentator that was specified in the request for the commentary data. Further, the commentary data that is sent may comprise those portions of the commentary with emotional response metadata that meets a threshold value. It will be understood that, in some embodiments, the emotional response metadata may be sent to the requesting device along with the commentary, and the requesting device may then use the emotional response metadata to locate commentary of interest. In yet other embodiments, emotional response analysis may be performed at the time commentary is generated and published. Thus, such embodiments, the commentary received from the commentator and stored comprises the emotionally interesting parts of an original stream of commentary.

Figure 4A:
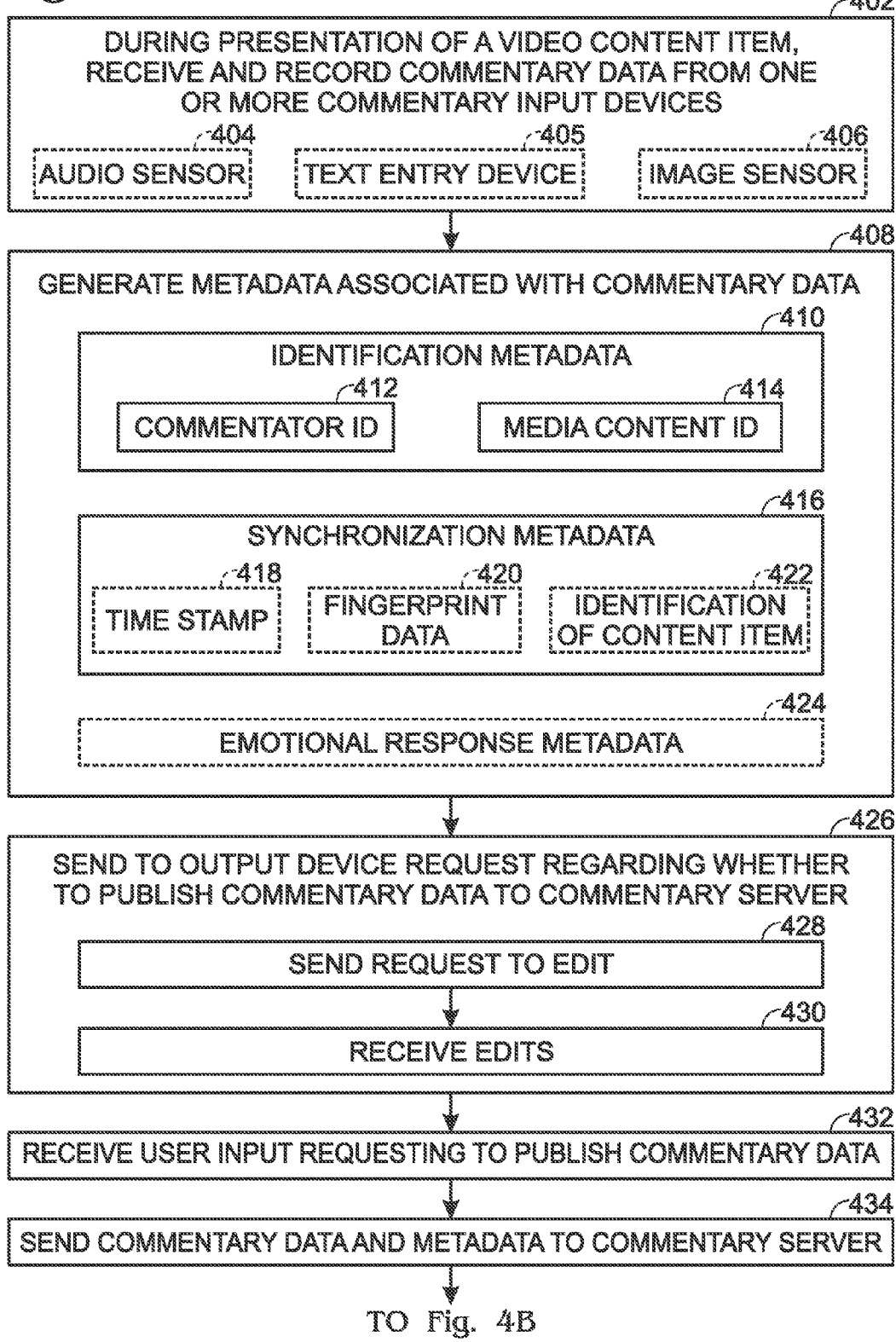

FIG. 4 shows an embodiment of a method 400 of providing commentary for video content items from a client device perspective. Method 400 comprises, at 402, receiving and recording commentary data from one or more commentary input devices during presentation of a video content item. Such sensors may include, but are not limited to, audio sensors 404, text entry devices 405, and image sensors 406.

Method 400 next comprises generating metadata associated with the commentary data. As mentioned above, the metadata may include identification metadata, such as a commentator identification 412 and a media content identification 414 that identifies the media content item associated with the commentary. The metadata also may include synchronization metadata, such as a time stamp 418, digital fingerprint data 420, and/or an identification of the media content item to be sent with the commentary to a media content provider so that the provider may generate more detailed synchronization metadata for the commentary (e.g. a proprietary time stamp).

The generated metadata may further comprise emotional response metadata to facilitate the identification of interesting portions of the commentary. Such emotional response metadata may be generated in any suitable manner. For example, the computing device that receives the sensor inputs may be configured to identify sounds, sound intensities, postures, motions, characteristics of motions (e.g. speed of motion, facial expression accompanying motion), etc. in the sensor data with particular emotions or emotional intensities, and to store the identified emotion and/or emotional intensity as a function of location within the media content item.

In some embodiments, the emotional response metadata may he used to identify potentially interesting portions of the commentary prior to uploading the commentary to the commentary server. Thus, in such embodiments, only the identified portions may be uploaded. In other embodiments, the emotional response metadata may be uploaded with the commentary data so that such analysis may be performed at a later time if desired.

In some embodiments, the computing device further may be configured to distinguish between the viewer's emotional response to a video item and the viewer's general temper. For example, in some embodiments, the computing device may ignore or otherwise store data indicating emotional displays detected when the commentator's attention is not focused on the media content item being displayed. Thus, as an example scenario, if the commentator is visibly annoyed because of a loud noise originating external to the video viewing environment, the computing device may be configured not to ascribe the detected annoyance with the video item, and may not record the annoyance at that temporal position within the viewer's emotional response profile for the video item. Further, in embodiments in the sensor data comprises image data, suitable eye tracking and/or face position tracking techniques may he employed (potentially in combination with a depth map of the video viewing environment) to determine a degree to which the viewer's attention is focused on the display device and/or the video item.

Continuing with FIG. 4, method 400 next comprises, at 426, sending, to an output device such as a display, a request regarding whether to publish the commentary data to a commentary server. This permits the commentator the opportunity to decline or accept publication, as desired. Further, such a request may further comprise, at 428, a request regarding whether the commentator wishes to edit the commentary before publishing the commentary, e.g. by deleting portions of the commentary. If the commentator elects to make such edits, the edits are received at 430. Then, a user input requesting to publish the commentary data is received at 432, and the commentary data and associated metadata are sent to the commentary server at 434. It will be understood that, if the user elects at 426 not to publish the commentary data, then processes 432 and 434 may be omitted.

The person recording the commentary also may elect to view the commentary of others at time, either during the recording of his/her own commentary, or at a different time. Thus, method 400 comprises, at 436, receiving a user input from the commentator (or other viewer in the same viewing environment) requesting to view other commentary generated by a member of a social network (formal or informal) of the requesting viewer, and at 438, sending a request to the commentary server for such commentary. Method 400 next comprises, at 440, receiving the requested other commentary, and at 442, presenting the other commentary. The other commentary may take any suitable form, including but not limited to audio, video, text, links, software triggers, and/or any other suitable data and information.

It will be understood that a viewer need not record his or her own commentary to receive commentary of others, and that the commentary production and commentary playback processes of FIG. 4 are presented together to illustrate an example use scenario. Thus, a viewer may perform processes 436-442 to locate commentary for a desired media content item without performing the other portions of method 400.

It will further be understood that the embodiments described herein may be configured to allow users to monetize the provision of content. For example, a content provider that also hosts a commentary service may allow users to earn money based upon a number of times commentary is viewed. Further, such monetization may be distributed to other involved parties, such as the content creator, as the content creator also benefits when a user watches content along with commentary.

The embodiments described herein also may facilitate performing analytics on video content. For example, commentary provided by users may be analyzed to determine where the commentary occurs in the show. Then, the nature of the commentary and the frequency at which commentary appears at different locations in a show may allow content creators, advertisers, and other interested parties to see what parts of a video content item generate particular interest among viewers. Likewise, as mentioned above, such analytics also may be used to determine interesting portions of commentary for presentation, such that portions of a commentary stream are presented, rather than the entire stream.

In some embodiments, the above described methods and processes may be tied to a computing system including one or more computers. In particular, the methods and processes described herein may be implemented as a computer application, computer service, computer API, computer library, and/or other computer program product.

FIG. 5 schematically shows a nonlimiting computing system 500 that may perform one or more of the above described methods and processes. Computing system 500 is shown in simplified form. It is to he understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc.

Computing system 500 includes a logic subsystem 502 and a data-holding subsystem 504. Computing system 500 may optionally include a display subsystem 506, communication subsystem 508, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may he configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may include one or more physical, non-transitory, devices configured to hold data and/or instructions executable by the logic subsystem to implement the herein described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem the form of removable computer-readable storage media 510, which may be used to store and/or transfer data and/or instructions executable to implement the herein described methods and processes. Removable computer-readable storage media 510 may take the form of CDs, DVDs, HD-DVDs, Blu-Ray Discs, EEPROMs, and/or floppy disks, among others.

It is to be appreciated that data-holding subsystem 504 includes one or more physical, non transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 500 that is implemented to perform one or more particular functions. In some cases, such a module, program, or engine may be instantiated via logic subsystem 502. executing instructions held by data-holding subsystem 504. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data tiles, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or data-holding subsystem 504 in a shared enclosure, or such display devices may be peripheral display devices.

When included, communication subsystem 508 may be configured to communicatively couple computing system 500 with one or more other computing devices. Communication subsystem 508 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of providing commentary for media content to media presentation devices, the method comprising:
   receiving from each of a plurality of commentary input devices an input of commentary data;
   for each input of commentary data, receiving identification metadata identifying a commentator and an associated media content item;
   for each input of commentary data, receiving synchronization metadata that synchronizes the commentary data with the associated media content item;
   for each input of commentary data, receiving emotional response metadata determined from analysis of the commentary data, the emotional response metadata representing an emotional response of the commentator as a function of location within the associated media content item;
   storing each input of commentary data along with the synchronization metadata, the emotional response metadata, and the identification metadata;
   receiving a request from a requesting media presentation device for commentary relevant to a specified media content item and a specified user;
   identifying relevant commentary data based upon social network information for the specified user and also based upon identification metadata associated with commentary data received from social network members; and
   sending the relevant commentary data to the requesting media presentation device.

2. The method of claim 1, wherein the commentary data received comprises a stream of audio and/or video data.

3. The method of claim 1, wherein the commentary data received comprises portions of a stream of audio and/or video data.

4. The method of claim 1, wherein the commentary data comprises one or more of text, markup content, and one or more software triggers.

5. The method of claim 1, wherein identifying the relevant commentary data comprises identifying one or more portions of a stream of audio and/or video commentary data based upon the emotional response metadata, and wherein sending the relevant commentary data comprises sending the one or more portions of the stream of audio and/or video commentary data.

6. The method of claim 1, further comprising sending the synchronization metadata with the commentary data.

7. The method of claim 1, wherein the synchronization metadata comprises time stamp data.

8. The method of claim 1, wherein the synchronization metadata comprises an identification of a video presentation, and further comprising generating time stamp data based upon the identification of the video presentation.

9. The method of claim 1, wherein the synchronization metadata comprises digital fingerprint data.

10. The method of claim 1, wherein the commentary data is sent to a mobile device.

11. The method of claim 1, wherein receiving the emotional response metadata comprises generating the emotional response metadata from the commentary data at the computing device.

12. The method of claim 1, wherein receiving the emotional response metadata comprises receiving the emotional response metadata from the plurality of commentary input devices.

13. A media server, comprising:
   a logic subsystem; and
   a data-holding subsystem comprising instructions stored thereon that are executable by the logic subsystem to:
     receive from each of a plurality of commentary detection systems a stream of commentary data;
     receive identification metadata identifying a commentator and an associated media content item, synchronization metadata that synchronizes the stream of commentary data with the associated media content item, and emotional response metadata determined from analysis of the stream of commentary data and representing an emotional response of a commentator as a function of location within the associated media content item;
     store each stream of commentary data along with the synchronization metadata, the identification metadata, and the emotional response metadata;
     receive a request from a requesting media presentation device for commentary relevant to a specified media content item and a specified user;

identify relevant commentary data based upon social network information for the specified user and identification metadata associated with commentary data originated by social network members;

send the relevant commentary data in response to the request; and send synchronization metadata associated with the relevant commentary data in response to the request.

14. The media server of claim 13, wherein the instructions are further executable to identify relevant commentary by identifying portions of the commentary data via the emotional response metadata.

15. The media server of claim 13, wherein the instructions are further executable to send the relevant commentary data to a mobile device.

* * * * *